Jan. 26, 1937. E. E. HAYES 2,069,147
FURROW OPENER
Filed March 2, 1936
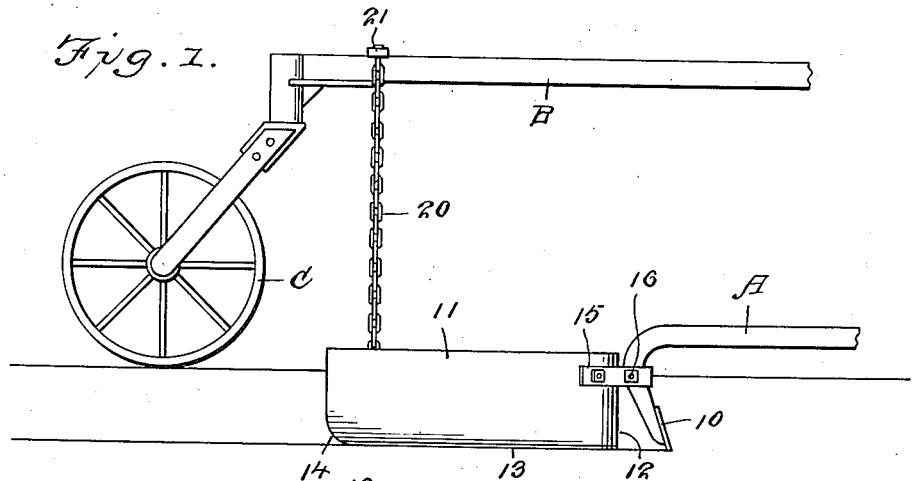
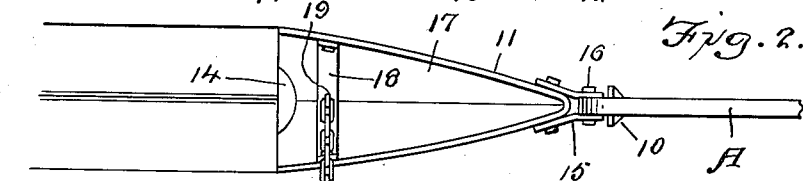
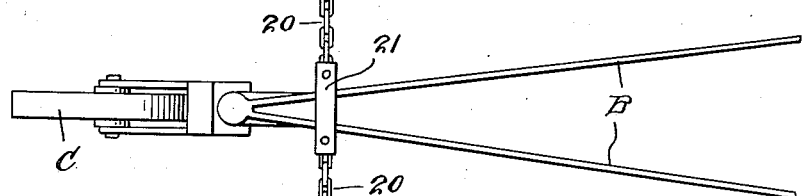
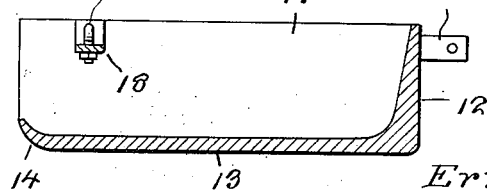 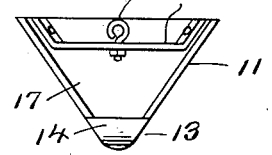
Ernest E. Hayes INVENTOR
BY Victor J. Evans & Co.
ATTORNEY Patented Jan. 26, 1937

2,069,147

UNITED STATES PATENT OFFICE 2,069,147

FURROW OPENER

Ernest E. Hayes, Delta, Colo.

Application March 2, 1936, Serial No. 66,743

1 Claim. (Cl. 37—98)

The invention relates to a ditcher and more especially to a furrow opener.

The primary object of the invention is the provision of an opener of this character, wherein through the use of ditch formers the ground can be worked so as to provide therein irrigating ditches, the opener being of novel construction and cooperating with the shovels which cut the furrow so that the formers will create the ditches, the sides being rendered smooth so as to avoid damming of the water flowing therethrough during irrigation.

Another object of the invention is the provision of an opener of this character, wherein several ditches can be formed in a single operation and the walls of these ditches will be rendered smooth, the loose dirt being laterally directed from within the ditches and packed with the sides thereof.

A further object of the invention is the provision of an opener of this character, which is extremely simple in its construction, thoroughly reliable and effective in its operation, readily and easily attached to a ground working machine, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a side elevation of an opener constructed in accordance with the invention and shown attached to a shovel beam of a ground working implement.

Figure 2 is a top plan view.

Figure 3 is a vertical longitudinal sectional view through the opener.

Figure 4 is a rear elevation.

Similar reference characters indicate corresponding parts throughout the several views in the drawing.

Referring to the drawing in detail, A designates generally a portion of a shovel beam of a ground working implement, in this instance there being shown two of such beams and these are hung conventionally from the frame of such implement, a portion of the frame being indicated at B and is equipped with a trailer wheel or caster wheel C. Each beam A has fixed thereto the usual shovel 10 for the cutting of a furrow in the ground.

Adapted for attachment to the beam A is a furrow opener which constitutes the present invention and comprises a casting formed with forwardly convergent inwardly inclined sides 11, those at the forward end of said casting being merged into a rounded perpendicular nose 12. The sides 11 of the casting have their inclines gradually decreasing in the direction of the nose 12 while such sides merge into each other at the bottom of the casting as at 13. The bottom 13 at the heel end of the casting is formed with an upwardly curved heel 14.

Suitably secured to the forward end of the casting at the nose 12 on opposite sides of the same are coupling straps 15, which through a fastener 16 are pivotally joined with the beam A at a point above the shovel 10 so that the casting will follow the shovel 10 when working the ground.

The casting in the trough formation 17 thereof has fitted therein a cross strap 18 carrying centrally thereof an eye 19 with which is connected a hanger chain 20, the latter being attached to a saddle piece 21 on the frame B.

In Figure 2 of the drawing there is shown in association a pair of castings and these having connected thereto the pair of chains 20 from the saddle piece 21 so that in the use of the ground working implement when cutting furrows in the ground the castings following the shovels 10 will iron the sides of the furrow for the formation of ditches thereby with smooth side walls and in this forming operation the said furrows will be maintained open for creating irrigating ditches without liability of the damming of water when flowing therethrough during irrigation.

It is, of course, understood that any number of castings can be employed corresponding to the number of shovels used with the equipment of the ground working implement.

By the arrangement of the coupling straps 15 which function as a clevis these can be adjusted in conformity with the thickness of the beam A carrying the shovel 10 and function to hold the casting in an upright position when working within a furrow.

What is claimed is:

The combination of a wheeled trailer, a saddle piece carried by said trailer, furrow openers arranged at opposite sides of the trailer and each formed with forwardly convergent inwardly inclined sides and a rounded perpendicular nose having the inclined sides merging therewith, the inclined sides being merged into each other at the bottom of said opener, an upwardly curved heel at the rear end of the bottom of said opener, coupling straps secured exteriorly to the openers at the nose ends thereof, shovel carrying beams pivoted to said straps at points above the shovels thereof, cross straps within the openers and fixed to the sides thereof, eyes located centrally of said straps, and hanger chains connected to opposite ends of the saddle and to the said eyes.

ERNEST E. HAYES.